United States Patent
Kuo et al.

(10) Patent No.: US 11,152,980 B2
(45) Date of Patent: Oct. 19, 2021

(54) ADAPTIVE DIGITAL PRECODER CODEBOOK CONFIGURATIONS FOR MMWAVE COMMUNICATION BASED ON HYBRID BEAMFORMING

(71) Applicant: IDAC Holdings, Inc., Wilmington, DE (US)

(72) Inventors: Ping-Heng Kuo, Bristol (GB); Alain Mourad, Staines-Upon-Thames (GB); Katla Satyanarayana, Southampton (GB); Mohammed El-Hajjar, Southampton (GB)

(73) Assignee: IDAC HOLDINGS, INC., Wilmington, DE (US)

( * ) Notice: Subject to any disclaimer, the term of this patent is extended or adjusted under 35 U.S.C. 154(b) by 77 days.

(21) Appl. No.: 16/493,698

(22) PCT Filed: Mar. 23, 2018

(86) PCT No.: PCT/US2018/024190
§ 371 (c)(1),
(2) Date: Sep. 12, 2019

(87) PCT Pub. No.: WO2018/183131
PCT Pub. Date: Oct. 4, 2018

(65) Prior Publication Data
US 2021/0135716 A1 May 6, 2021

Related U.S. Application Data

(60) Provisional application No. 62/477,183, filed on Mar. 27, 2017.

(51) Int. Cl.
*H04B 7/06* (2006.01)
*H04B 7/0456* (2017.01)

(52) U.S. Cl.
CPC ......... *H04B 7/0456* (2013.01); *H04B 7/0617* (2013.01); *H04B 7/0639* (2013.01)

(58) Field of Classification Search
CPC ... H04B 7/0456; H04B 7/0617; H04B 7/0639
See application file for complete search history.

(56) References Cited

U.S. PATENT DOCUMENTS

8,908,747 B2 * 12/2014 Nammi ............... H04B 7/0486
375/219
9,362,994 B2   6/2016 Seol
(Continued)

FOREIGN PATENT DOCUMENTS

CN   102185643 A   9/2011
CN   104303477 A   1/2015
(Continued)

OTHER PUBLICATIONS

Panasonic, "Performance Evaluation of 8Tx Codebook Subsampling in PUCCH 1-1 CSI Mode II". Third Generation Partnership Project, 3GPP TSG RAN WG1 Meeting #63, R1-106076, Nov. 15-19, 2010, pp. 1-7.

(Continued)

*Primary Examiner* — Kenneth T Lam
(74) *Attorney, Agent, or Firm* — Invention Mine LLC

(57) ABSTRACT

Base stations and user terminals may adaptively configure a digital precoder codebook for mmWave-based hybrid beamforming, such as by determining at least one analog beamformer and combiner, determining at the user terminal a lowest codebook resolution of digital precoding that can be used to achieve at least one performance parameter, and communicating to the base station the determined lowest codebook resolution of digital precoding. The adjustment of digital precoder codebook resolution, on top of analog beamforming, across different radio resources (e.g. time/frequency) may optimize feedback efficiency for a user (Continued)

terminal. In some cases, the user terminal may also receive from a base station an assistance parameter relating to an achievable performance gain using digital precoding. The user terminal may use the received assistance parameter in determining the digital precoder codebook resolution.

20 Claims, 12 Drawing Sheets

(56) References Cited

U.S. PATENT DOCUMENTS

| | | | |
|---|---|---|---|
| 9,667,327 | B2 | 5/2017 | Lee |
| 2013/0010880 | A1* | 1/2013 | Koivisto ............ H04B 7/065 375/259 |
| 2013/0057432 | A1* | 3/2013 | Rajagopal ............ H01Q 3/26 342/368 |
| 2013/0157660 | A1 | 6/2013 | Awad |
| 2013/0258972 | A1* | 10/2013 | Kim ............ H04B 7/0634 370/329 |
| 2013/0301454 | A1* | 11/2013 | Seol ............ H04B 7/0695 370/252 |
| 2013/0315284 | A1* | 11/2013 | Nammi ............ H04B 7/0486 375/219 |
| 2014/0355707 | A1* | 12/2014 | Kim ............ H04B 7/086 375/267 |
| 2015/0236774 | A1 | 8/2015 | Son et al. |
| 2015/0341093 | A1* | 11/2015 | Ji ............ H04B 7/0478 375/267 |
| 2017/0181132 | A1 | 6/2017 | Xiao |
| 2018/0159603 | A1* | 6/2018 | Kim ............ H04L 27/2613 |
| 2020/0028609 | A1* | 1/2020 | Ahn ............ H04W 24/08 |

FOREIGN PATENT DOCUMENTS

| | | |
|---|---|---|
| CN | 105684321 A | 6/2016 |
| RU | 2576521 C2 | 3/2016 |
| WO | 2016062292 A1 | 4/2016 |

OTHER PUBLICATIONS

Shuang, T. et. al., "Design and Evaluation of Lte-Advanced Double Codebook". IEEE 73rd Vehicular Technology Conference (VTC Spring), (2011), 5 pages.

Invitation to Pay Additional Fees, and where applicable, protested, for PCT/US2018/024190 mailed Jul. 5, 2018.

International Search Report and Written Opinion of the International Searching Authority for PCT/US2018/024190 dated Sep. 10, 2018.

Kutty, S., et. al., "Beamforming for Millimeter Wave Communications: An Inclusive Survey". IEEE Communications Survey & Tutorials, vol. 18, No. 2, second quarter (2016), pp. 949-973.

Alkhateeb, A., et. al., "Limited Feedback Hybrid Precoding for Multi-User Millimeter Wave Systems". IEEE Transactions on Wireless Communication, vol. 14, No. 11, Nov. 2015, pp. 6481-6494.

Gimenez, S., et. al., "Performance Evaluation of Analog Beamforming with Hardware Impairments for mmW Massive MIMO Communication in an Urban Scenario". MDPI Sensors, vol. 16, No. 1555, Sep. 22, 2016, pp. 1-17.

Singh, J., et. al., "On the Feasibility of Codebook-Based Beamforming in Millimeter Wave Systems with Multiple Antenna Arrays". IEEE Transactions on Wireless Communication., vol. 14, No. 5, (2015), 11 pages.

Lee, Namjeong., et. al., "A New Codebook Structure for Enhanced Multi-User MIMO Transmission in mmWave Hybrid-Beamforming System". IEEE Globecom Workshops (GC Wkshps), (2015), pp. 1-6.

International Preliminary Report on Patentability for PCT/US2018/024190 dated Oct. 1, 2019, 15 pages.

Huawei, Hisilicon "UL SRS design for CSI acquisition and beam management". Third Generation Partnership Project. 3GPP TSG RAN WG1 Meeting #88, R1-1701699, Athens, Greece Feb. 13-17, 2017. (8 pages).

* cited by examiner

ADAPTIVE DIGITAL PRECODER CODEBOOK CONFIGURATIONS FOR MMWAVE COMMUNICATION BASED ON HYBRID BEAMFORMING

CROSS-REFERENCE TO RELATED APPLICATIONS

The present application is a national stage application under 35 U.S.C. 371 of International Application No. PCT/US2018/024190, entitled "ADAPTIVE DIGITAL PRECODER CODEBOOK CONFIGURATIONS FOR MMWAVE COMMUNICATION BASED ON HYBRID BEAMFORMING", filed on Mar. 23, 2018, which claims benefit under 35 U.S.C. § 119(e) from U.S. Provisional Patent Application Ser. No. 62/477,183, filed Mar. 27, 2017, entitled "ADAPTIVE DIGITAL PRECODER CODEBOOK CONFIGURATIONS FOR MMWAVE COMMUNICATION BASED ON HYBRID BEAMFORMING", which is incorporated herein by reference in its entirety.

BACKGROUND

In order to meet the high data rate required for next generation of cellular communication systems, the wireless industry and academia have been exploring ways to leverage the large bandwidths available at above-6 GHz frequencies (e.g., centimeter wave (cmW) and millimeter wave (mmW) frequencies). One challenge of using these above-6 GHz frequencies may be issues with signal propagation, which has been considered unfavorable for wireless communication, especially in an outdoor environment.

The propagation of higher frequencies, such as these, may experience higher free space path loss. Rainfall and atmospheric gasses (e.g., oxygen, nitrogen, and hydrogen) may add further attenuation for above-6 GHz frequencies. In addition, foliage may cause attenuation and depolarization. Penetration and diffraction attenuation may also become more severe. As a result, Non Line-Of-Sight (NLOS) propagation path loss may be significant at above-6 GHz frequencies. For example, at mmW frequencies NLOS path loss may be more than 20 dB higher than Line-Of-Sight (LOS) path loss.

Outdoor mmW cellular networks may be feasible through the use of beamforming techniques. In particular, hybrid analog-digital beamforming may be one approach to realize mmWave communications in future wireless networks. Thus, it may be desired to develop a mechanism to enhance operational efficiency of a mmWave cellular system based on a hybrid beamforming framework.

SUMMARY

Methods, apparatuses and systems are provided for adaptively configuring a digital precoder codebook for mmWave-based hybrid beamforming.

According to an example, methods, apparatuses and systems are provided for transmitting a signal using hybrid beamforming including adaptively applying digital beamforming and analog beamforming, the digital beamforming including adaptively configuring a digital precoder codebook resolution.

Methods, apparatuses and systems may further include, determining at least one analog beamformer and combiner, determining a lowest codebook resolution of digital precoding that can be used to achieve at least one performance parameter, transmitting the determined lowest codebook resolution of digital precoding to a network.

In one embodiment, a method for a mmWave user terminal capable of analog beamforming and digital beamforming may comprise: receiving, from an access node, a downlink reference signal using an analog beamforming setting; measuring, using the received downlink reference signal, an effective channel based on the analog beamforming setting; receiving, from the access node, an assistance parameter relating to an achievable performance gain using digital precoding; determining, based on the measured effective channel and the received assistance parameter, a minimum digital precoder codebook resolution; and sending the determined minimum digital precoder codebook resolution to the access node.

BRIEF DESCRIPTION OF THE DRAWINGS

A more detailed understanding may be had from the following description, given by way of example in conjunction with the accompanying drawings wherein:

FIG. 10 illustrates a flow diagram of another example system process according to one or more embodiments.

EXAMPLE NETWORKS FOR IMPLEMENTATION OF THE EMBODIMENTS

Figure 1A:
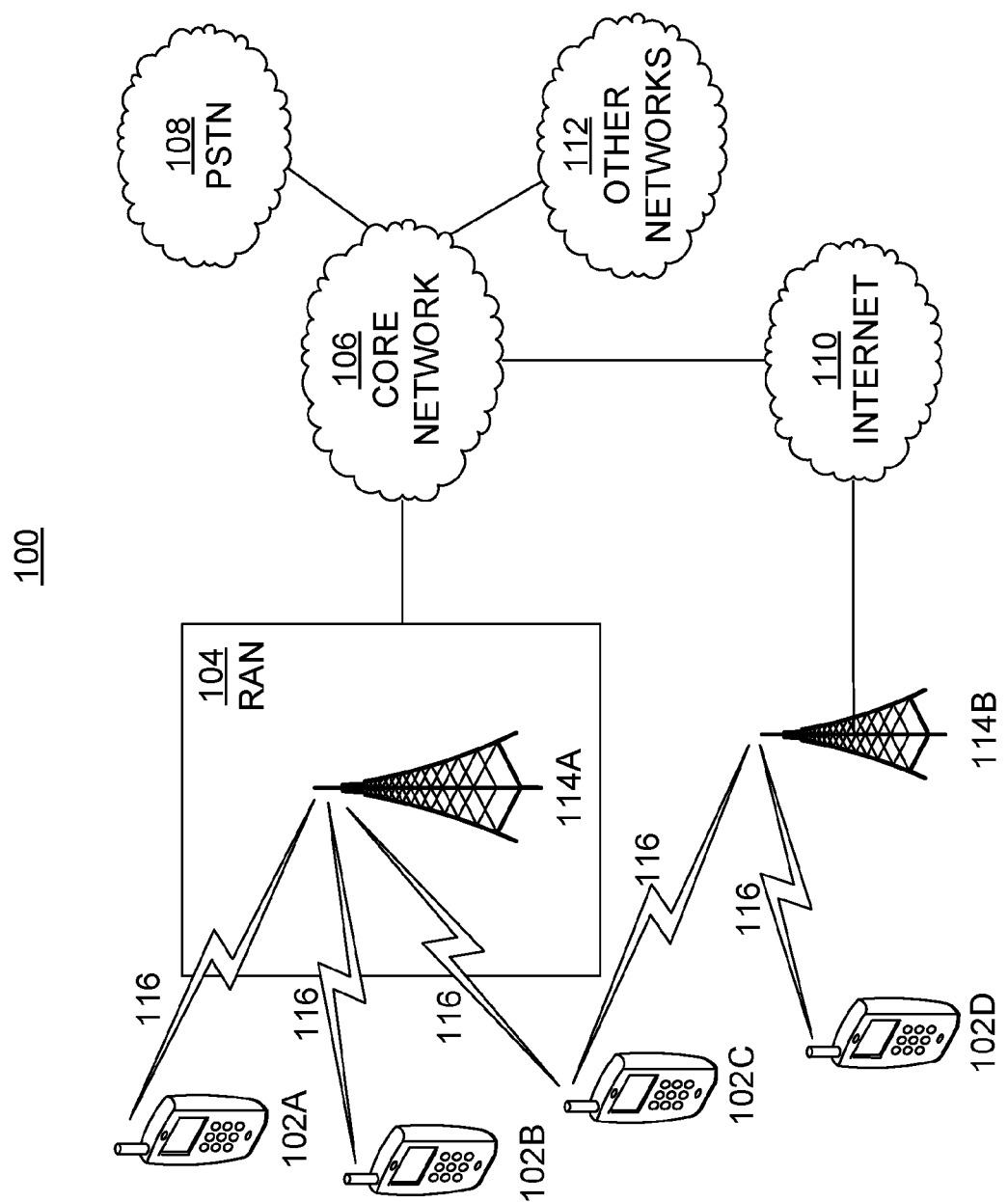
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth.

For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B (eNB), a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
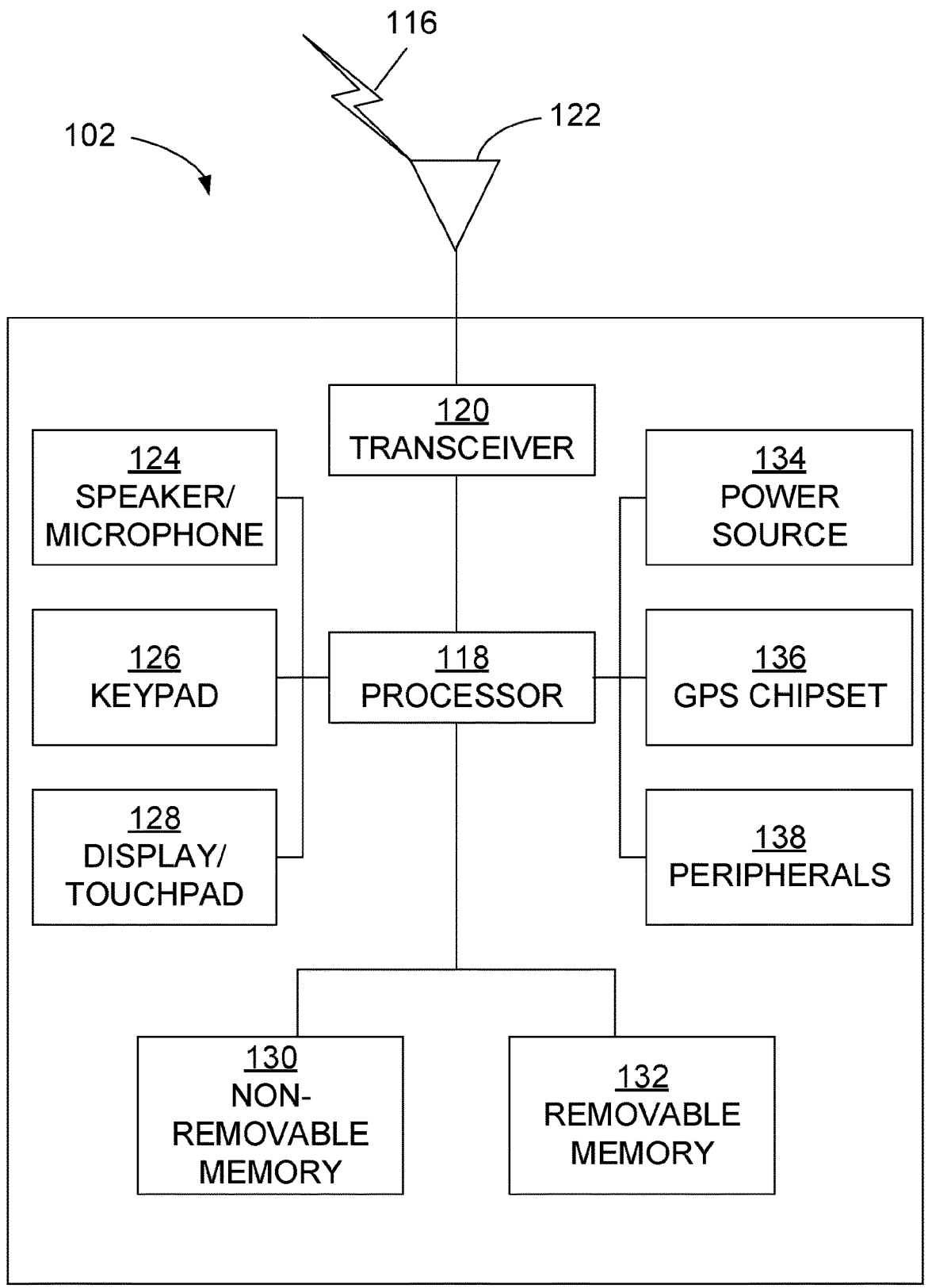
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements.

The processor 118 may be a general purpose processor, a special purpose processor, a generic processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
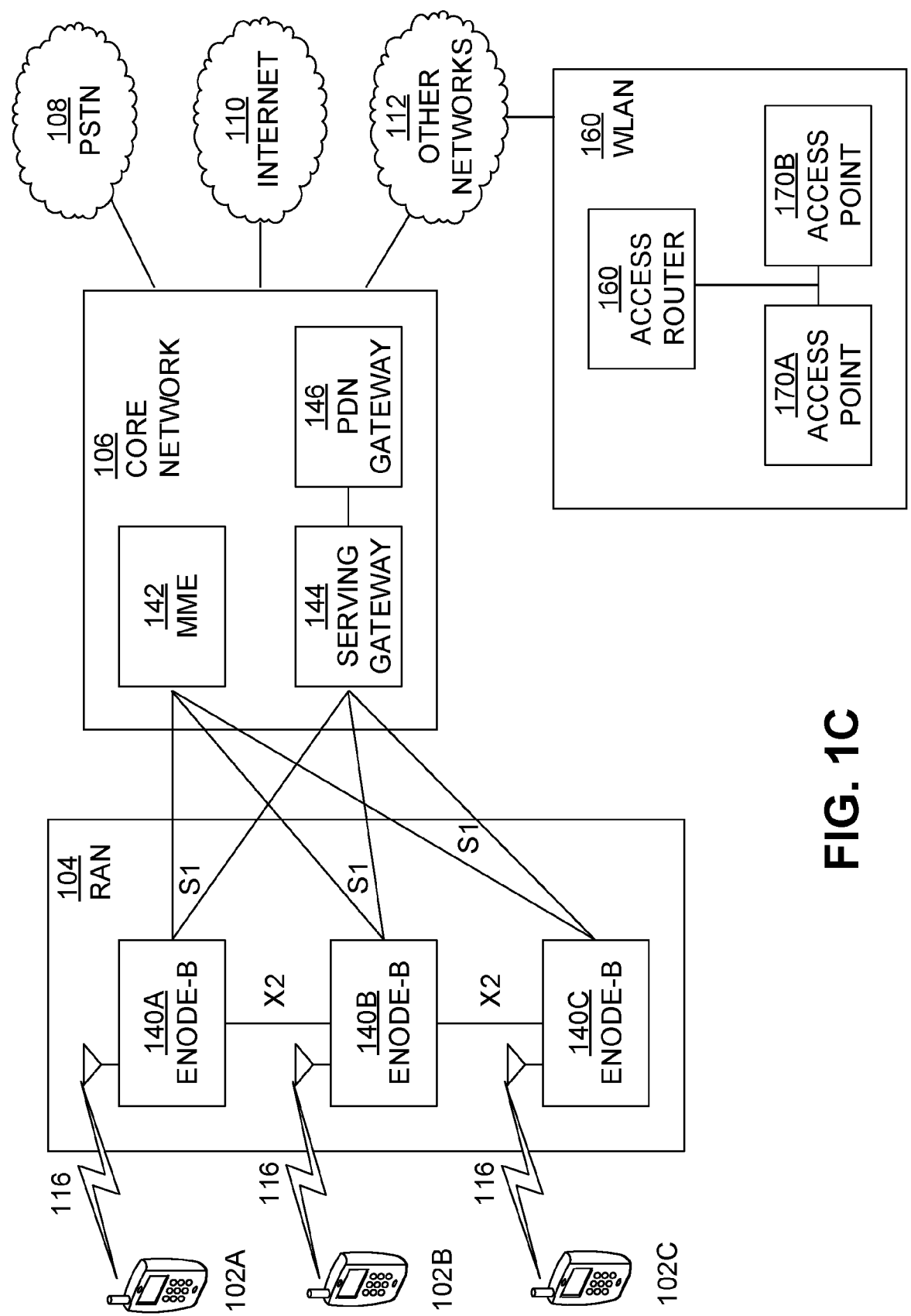

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

At least one base station (BS, or access node) and at least one user device/user terminal (e.g., a WTRU) may be used in a mmWave system operating in a mmWave frequency range, where the user terminal (WTRU) can be either a human-device (e.g., a smartphone) or a machine-type device (e.g., a sensor). Additionally, by using beamforming technologies with a massive antenna array, at least one narrow directional beam may be generated by a transmitter of each device, which effectively enhances the signal gain toward the target receiver, while reducing potential interference to other receivers. Moreover, through beam division, multiple users can be concurrently served in the same time/frequency resource (MU-MIMO), which improves the system spectral efficiency.

In hybrid beamforming, both digital beamforming (i.e., in a baseband domain) and analog beamforming (i.e., in an RF domain) are applied to strike a balance between performance and complexity (as discussed in S. Kutty and D. Sen, "Beamforming for millimeter wave communications: an inclusive survey", IEEE Communications Survey & Tutorials, Vol. 18, No. 2, April 2016, pp. 949-973). In some embodiments, the digital beamforming may comprise digital precoding using one or more digital precoder codebooks.

Figure 2:
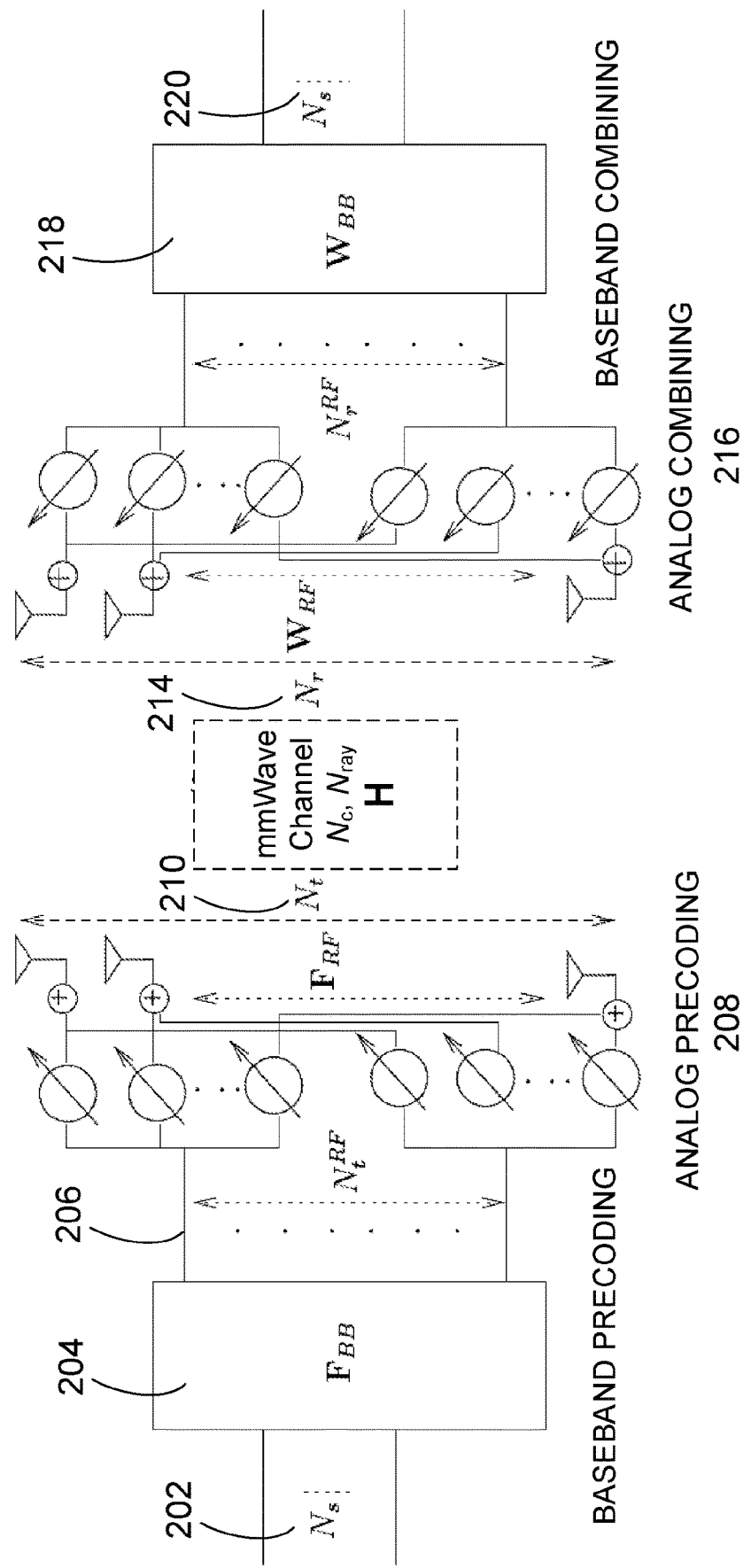
FIG. 2 illustrates a block diagram of a transceiver architecture for hybrid beamforming according to one or more embodiments.

FIG. 2 illustrates an example architecture of hybrid beamforming. In particular, the example architecture shows that $N_s \geq$ data streams (202) are mapped in the baseband domain to $N_t^{RF} \geq 1$ RF chains (206) via an $N_t^{RF}$-by-$N_s$ digital precoder ($F_{BB}$) (204). The RF output is further mapped in the RF domain to $N_t$ physical antenna elements (210) via an $N_t$-by-$N_t^{RF}$ analog precoder ($F_{RF}$) (208), where phase shifters are applied for beamforming weights for analog beamforming. Similarly, at the receiver side, the signal vector received at the array (214) comprising $N_r$ physical antenna elements is processed with analog combiner ($W_{RF}$) (216) in the RF domain and followed by digital combiner ($W_{BB}$) (218) in the baseband domain, prior to demodulation of $N_s \geq 1$ data symbols (220). Additionally, there are two types of analog beamforming schemes, namely full-connection and subarray architectures.

The overall mathematical model of the received baseband signal y in flat fading can be written as:

$$Y = W_{BB} W_{RF} H F_{RF} F_{BB} x + n \qquad \text{Eq. 1}$$

where x represents transmit symbols and n denotes additive noise. Hybrid beamforming may be undertaken with a two-stages procedure (as discussed in Alkhateeb, et al., "Limited feedback hybrid precoding for multi-user millimeter wave systems", *IEEE Trans. Wireless Commun.*, Vol. 14, November 2015, pp. 6481-6494) such that, at a first state, TX/RX analog beamformers ($F_{RF}$ and $W_{RF}$) are determined based on, for example, angular angles of departure and/or arrival of the dominant radio signal path at both the base station and the user terminal. Then, at the second stage, digital precoder ($F_{BB}$) may be selected by the user terminal from a pre-defined codebook based on the effective channel (i.e., the channel that captures the effects of analog beamforming) measured using downlink reference signals. The codebook is a set of matrices that can be used to represent $F_{BB}$. The selected precoder index (e.g., a precoding matrix index (PMI)) may be reported by the user terminal with a dedicated feedback mechanism.

In view of the above, the effective channel $H_{eff}$ can be written as:

$$H_{eff} = W_{RF} H F_{RF} \qquad \text{Eq. 2}$$

By measuring the downlink reference signals (e.g., channel state information-reference signal (CSI-RS)) that undergo such effective channels, the user terminal can select a PMI for digital precoding by evaluating which precoding matrix in the codebook C enables maximum performance gain if it is applied:

$$F^*_{BB} = \arg\max\ G(H_{eff}, F_{BB}) \qquad \text{Eq. 3}$$

where the function G outputs certain performance metrics, such as capacity, throughput, or signal-to-interference-plus-noise ratio (SINR). Meanwhile, the user terminal may compute the digital combiner $W_{BB}$ based on the index selection from a precoder codebook.

In general, a digital precoder codebook with higher resolution (i.e., a larger codebook size) may allow the transmitter to capture the spatial channel with a finer granularity, which in turn gives better performance. However, at the same time, it increases the burden of feedback overhead for the receiver, as the number of bits for digital precoder feedback (PMI) increases with codebook resolution. In hybrid beamforming, it is possible that analog beamforming alone is sufficient to capture dominant paths in the propagation channel. Therefore, the additional benefit brought by a high resolution digital precoder codebook may be limited. For user terminals located in rich-scattering environment, digital precoding may be helpful as diversity and/or multiplexing gain in the channel can be exploited. Nevertheless, in some instances the benefits of digital precoding may be marginal for a user terminal with a strong line of sight (LoS) path, in which cases analog beamforming alone may be sufficient.

Figure 3:
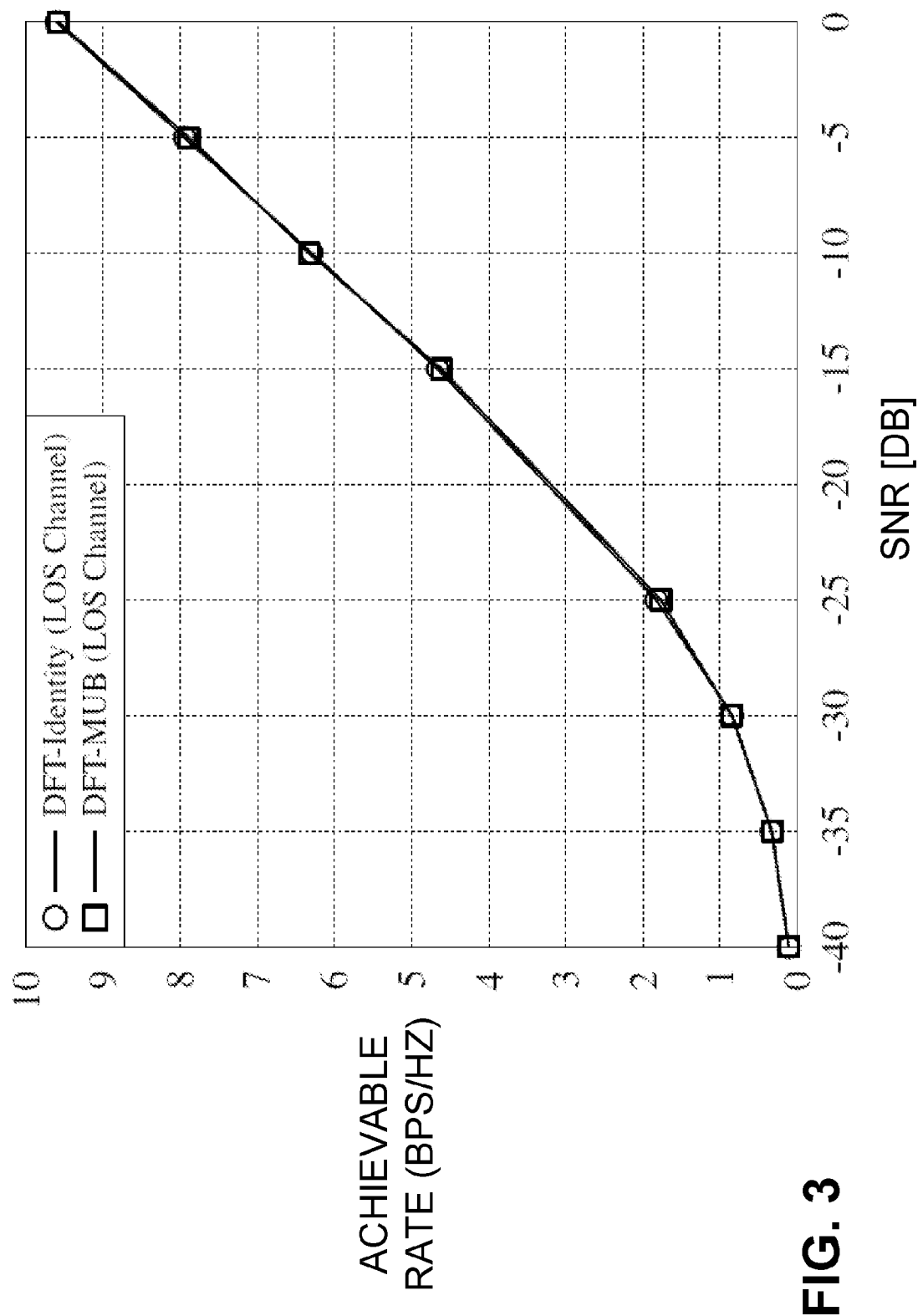
FIG. 3 illustrates a graph of a comparison of achievable rate between hybrid beamforming schemes with and without digital precoding, in a LoS channel.

FIG. 3 illustrates a graph of a comparison of achievable rate between hybrid beamforming schemes with and without digital precoding, in a LoS channel. As shown in the simulation results of FIG. 3, it can be observed that digital precoding (in which a mutual-unbiased (MUB) codebook is used) does not provide further enhancement to achievable rate in a LoS channel when analog beamforming (based on a discrete Fourier transform (DFT) codebook) is already applied.

A user terminal (e.g., a WTRU) is provided that is equipped with at least one radio transceiver and at least one computational entity that enable the user terminal to measure effective downlink channel responses attributed to mmWave analog beamforming and conduct at least one of the following: (1) determine the minimum digital precoder codebook resolution for achieving desirable link quality on top of analog beamforming, (2) determine whether digital precoding is necessary to achieve desirable link quality on top of analog beamforming, (3) extract information relating to assistance parameters (e.g., Performance Improvement Threshold (PIT) and/or Absolute Performance Threshold (APT)) from the base station, and/or (4) transmit a decision on digital precoder codebook resolution and/or a decision on activation/deactivation of digital precoding (e.g., by activation or deactivation of digital precoder feedback at the user terminal) to the base station.

A base station is provided that is equipped with at least one radio transceiver and at least one computational entity that enable the base station to conduct at least one of following: (1) determine at least one assistance parameter (e.g., PIT and/or APT) and transmit the information of these assistance parameters to at least one user terminal, (2) receive information relating to decision on digital precoding codebook resolution and activation/deactivation of digital precoding from the user terminal (e.g., by activation or deactivation of digital precoder feedback at the user terminal), and/or (3) configure downlink transmission module with the digital precoder codebook resolution in accordance to the related information received from the user terminal.

Figure 4:
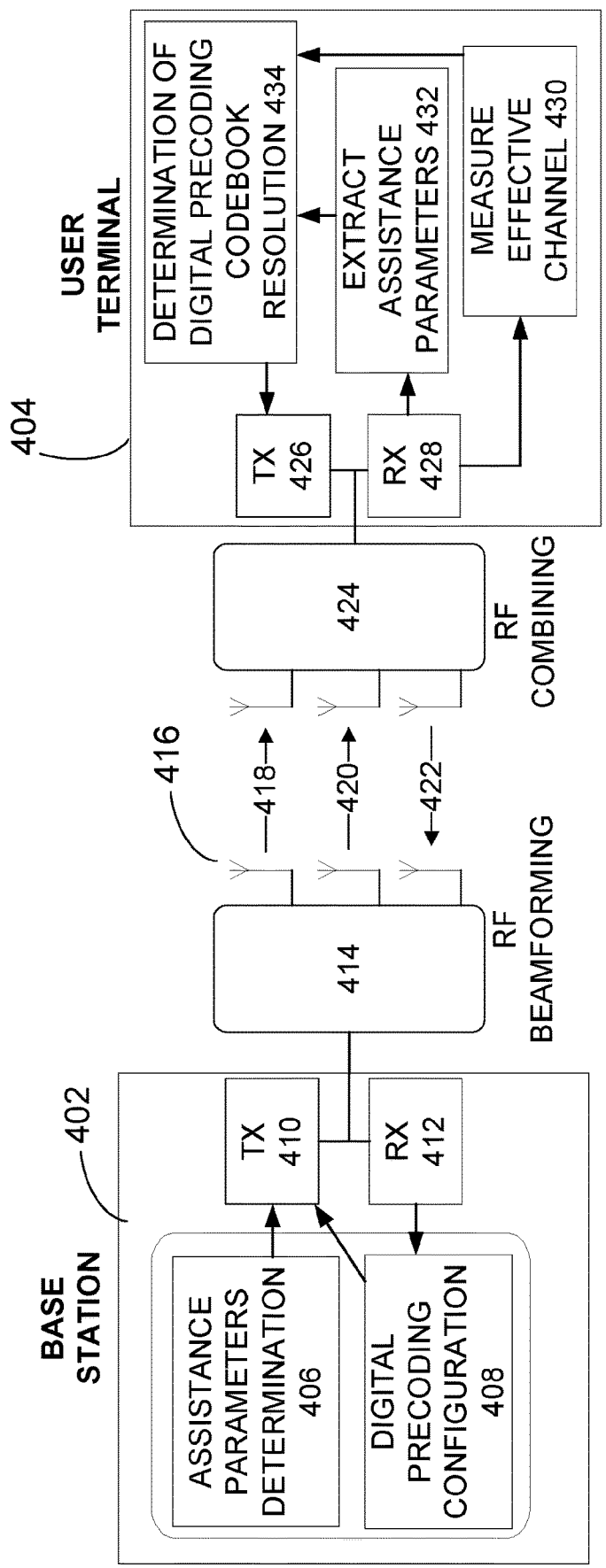
FIG. 4 illustrates a schematic block diagram of a system for hybrid beamforming, according to one or more embodiments.

FIG. 4 illustrates a schematic diagram of an embodiment of a system for adaptively configuring a codebook for digital precoding of mmWave-based hybrid beamforming. In particular, the digital precoder codebook resolution, on top of analog beamforming, can be adjusted across different radio resources (e.g., time/frequency), which in turn may optimize the feedback efficiency for a user terminal.

The system shown in FIG. 4 incorporates a two-stage procedure as described above. Therefore, in the beginning, both the base station 402 and the user terminal 404 can determine the analog beamformers (414)/combiners (424) $F_{RF}$ and $W_{RF}$, which can be constructed or chosen from an "RF beambook" based on estimations of spatial channel characteristics such as Angle-of-arrival (AoA) and/or Angle-of-Departure (AoD), which are the angular bins in which the highest energy level can be perceived. There are several different methods of RF beamformer/combiner selection for analog beamforming known to those of ordinary skill in the relevant art (such as discussed in J. Singh and S. Ramakrishna, "On the feasibility of codebook-based beamforming in millimeter wave systems with multiple antenna arrays", *IEEE Trans. Wireless Commun.*, Vol. 14, May 2015, pp. 2670-2683), none of which are intended to be limiting herein.

A base station 402 may comprise a TX 410 and a RX 412, and may perform RF beamforming 414. A user terminal 404 may comprise a TX 426 and a RX 428, and may perform RF combining 424. Both the base station and user terminal may have antenna(s) 416.

Given that analog beamforming is in place, such as by the above process (or comparable processes as known to those of ordinary skill in the relevant art), the user terminal 404 may evaluate the lowest codebook resolution of digital precoding (434) that may be utilized to achieve the desirable performance in order to sustain a reliable wireless link to the network while minimizing feedback burden for digital precoding.

To do this, the base station 402 may first determine at least one assistance parameter (406), which may be shared with the user terminal as part of unicast/multicast/broadcast downlink control signaling (420) (e.g., in either higher-layer signaling such as radio resource control (RRC) signaling or physical control signaling), in a bid to assist digital codebook resolution determination (434) at the user terminal 404. The assistance parameter may be a PIT and/or an APT, but is not limited thereto.

The PIT is a threshold level of difference of a certain performance metric between cases with and without digital precoding. The performance metric may be SINR gain (in dB), channel quality indicator (CQI), capacity (in bits/sec), or any other metric that can be used to gauge link quality.

The APT is a threshold level of absolute value of a certain performance metric. The performance metric may be SINR gain (in dB), channel quality indicator (CQI), capacity (in bits/sec), or any other metric that can be used to gauge link quality.

The assistance parameters received at the user terminal from the base station or access node may indicate a target or desired performance threshold, that may or may not be achievable between the base station and the user terminal without digital precoding. Generally, the indicated performance threshold may require the use of digital precoding. In various embodiments, the evaluated performance of the user terminal under one or more digital precoder codebook resolutions may be compared to the target performance threshold to determine what codebook resolution, if any, may satisfy the target performance threshold. In some embodiments, the smallest codebook resolution (e.g., smallest available codebook size) under which the target performance threshold is satisfied may be selected as the minimum precoder codebook resolution.

Apart from the assistance parameters (420), the base station (e.g., an access node or "Node B") may also transmit downlink reference signals (e.g., RF beamformed reference signals) (418) (such as (Cell-Specific Reference Signal) CRS or CSI-RS) to the user terminal. The reference signals may be transmitted with the initially configured analog beamforming. Hence, a user terminal (e.g., WTRU) is able to measure the effective channel $H_{\mathit{eff}}$ (430) where the effect of analog beamforming has been taken into account. In addition, the user terminal may also extract the information of assistance parameters sent by the base station (432). By using the measured effective channel $H_{\mathit{eff}}$ and/or the assistance parameters received from the base station, the user terminal may compute a digital precoding codebook resolution (434) that allows it to maintain a radio link (to the base station) with sufficiently high quality to support the desired data rate or another performance metric. The result of the codebook resolution evaluation may be reported to the base station via uplink control channel such as an RRC reconfiguration message or physical control signaling (422) (e.g., digital precoding codebook resolution reporting). The user terminal may report more than one digital precoding codebook resolution, corresponding to multiple radio resources such as resource blocks, frequency bands, and transmission time intervals (TTIs).

Since the assistance parameters can be sent by the base station using an RRC reconfiguration message, the user terminal has the opportunity to update the codebook resolution whenever it receives an RRC reconfiguration message. For instance, assuming that a downlink RRC reconfiguration message is transmitted with a periodicity of 40 ms, as is done in current LTE schemes, then the user terminal may carry out computation and reporting of digital precoding codebook resolutions every 40 ms. The length of the interval, however, may change in future systems such as 5G. The reported codebook resolutions can be applied in the time/frequency radio resources that are scheduled to the user terminal before the next update.

Upon the reception of the reported codebook resolution from the user terminal with RX 412, the base station may configure the baseband module to carry out downlink data transmission in the radio resources scheduled for the user terminal with its reported codebook resolution. Also, in subsequent sessions, the base station may extract the feedback information for digital precoding, such as PMI, from the user terminal in accordance to the codebook resolution reported by the user terminal, as different codebook resolutions correspond to different bit-widths for precoder feedback. Under this scenario, the mapping between codebook resolution index and codebook size (and bit-width) has been specified and is known to both the base station and the user terminal. An example of such mapping is shown in Table 1:

TABLE 1

Exemplary Mapping of Codebook Resolution Index and Codebook Size

| Codebook Resolution Index, i | Codebook Size | Precoder (e.g., PMI) Report Bit-width |
|---|---|---|
| 0 | 1 | 0 (precoder feedback deactivated) |
| 1 | 4 | 2 |
| 2 | 16 | 4 |
| 3 | 64 | 6 |

In some embodiments discussed herein, the codebook resolution index is utilized as an ordered mapping from smallest to largest codebook resolution/codebook size (e.g., precoder report bit-width). In other instances, the codebook resolution index may use an alternative mapping that is not ordered from smallest to largest codebook resolution/codebook size, for example most frequent selection to most infrequent, largest to smallest codebook size, and/or the like.

Based on the previously discussed systems and methods for adaptively configuring a codebook for digital precoding for mmWave-based hybrid beamforming, several different example embodiments are provided. In some example embodiments (as discussed in relation to FIGS. 8-11), instances with binary adaptation, activation and deactivation, of digital precoding are provided. When digital precoding is "deactivated" (e.g., by deactivation of digital precoder feedback from the user terminal to the base station), an identity matrix may always be applied in baseband for mapping between data streams and antenna ports (RF chains), which means that the codebook size is one with only a single entry (identity matrix), so no PMI feedback is needed from the user terminal. Thus, "deactivation" of digital precoding by the base station is a response to deactivation of digital precoder feedback from a user terminal. It is worth noting that, although multi-user MIMO (MU-MIMO) schemes rely on signal separation via digital precoding, deactivation of digital precoding is still applicable as long as the users with preferred precoding matrices that are orthogonal to identity matrices are co-scheduled for MU-MIMO operation. For example, two users with digital precoding exemption can be paired for MU-MIMO since any two columns of an identity matrix are orthogonal, and signal separation can be achieved by analog beamforming alone.

In one exemplary embodiment, a base station 502 configures at least one user terminal (e.g., WTRU) 504 with a PIT, which can be used by the WTRU to determine the codebook resolution for digital precoding. An overall procedure for such an embodiment is depicted in the flow diagram of FIG. 5. Once an analog beamformer and a combiner are determined (506) and applied (508, 510), the base station can select a PIT (520) that will be configured to at least one user terminal. Note that a PIT can represent various types of performance metrics. For example, it can be a SNR gain (in dB), reception error probability, or a capacity gain (in bits/sec). The selection of a PIT may be determined by the base station based on one or more of: availability of uplink resources, a battery status of the user terminal, a mobility level of the user terminal, and/or the like. Thus, one or more assistance parameters, such as PIT, may be determined based on at least one of network status (such as traffic load), or user terminal status (such as mobility and/or battery status of the user terminal), and/or the like.

For example, if the uplink resources for CSI reporting are relatively scarce, the base station may set a lower PIT compared to when more uplink resources are available, so that the probability that a user terminal finds a low-resolution digital precoding providing performance improvement exceeding PIT is higher. Hence, this results in lower total feedback overhead among the all radio resources and all active users. Similarly, a low PIT may be configured if the user terminal has low battery, to reduce the chances that the user terminal may spend more computational power to select a PMI from a higher-resolution (larger) precoder codebook.

After the value of PIT is chosen by the base station, it should be sent as, for example, configuration information (522), to at least one user terminal based on unicast/multicast/broadcast signaling, depending on whether it is a user-specific configuration or a cell-specific configuration.

The downlink reference signals (such as CSI-RS) may be transmitted (524) under the settings of analog beamformers determined earlier so that the user terminal can measure the effective channel $H_{eff}$, which is a $N_r^{RF}$-by-$N_r^{RF}$ channel matrix. Based on the measured channel $H_{eff}$ (526), the user terminal evaluates the minimum digital precoder codebook resolution that allows the performance improvement to exceed the configured PIT (528). An exemplary procedure that the user terminal may undertake to determine the minimum codebook resolution is illustrated in the flow diagram of FIG. 6, where the user terminal should determine a codebook resolution index (e.g., according to Table 1) based on the configured value of PIT. In this example, the user terminal calculates channel capacity without digital precoding $C_{NO\_DP}$ and channel capacities under different digital precoder codebook resolutions index values i (denoted as $C_{DP,i}$), and determines the value of i which maps to the smallest codebook resolution/size that achieves $C_{DP,i} - C_{NO\_DP} > \text{PIT}$.

Thus, determining a minimum digital precoder codebook resolution may include calculating a link quality metric value (e.g., channel capacity, SNR or bit error rate) without digital precoding ($C_{NP\_DP}$) and link quality metric values under different digital precoder codebook resolutions index values i ($C_{DP,i}$), and determining determines the value of i which maps to the smallest codebook resolution/size such that a performance difference between $C_{DP,i}$ and $C_{NO\_DP}$ satisfies the PIT, as the minimum digital precoder codebook resolution.

Mobility level and battery status may also be taken into account in this example. When the user terminal is either moving too fast or running out of battery, digital precoder feedback can be exempted regardless of the configured PIT (for instance, as in Table 1 where codebook resolution index i=0 maps to precoder report bit-width of 0).

For each user terminal, at least one indication of codebook resolution may be reported to the base station by the user terminal (530), which represents at least one radio resource (time/frequency/code) that potentially can be scheduled to the user terminal for subsequent downlink services. That is the at least one indication of codebook resolution may be a suggestion as to which codebook resolution the user terminal has selected to meet above-mentioned criterial. The indication of codebook resolution may preferably be reported to the base station before the next update of codebook resolution.

Figure 5:
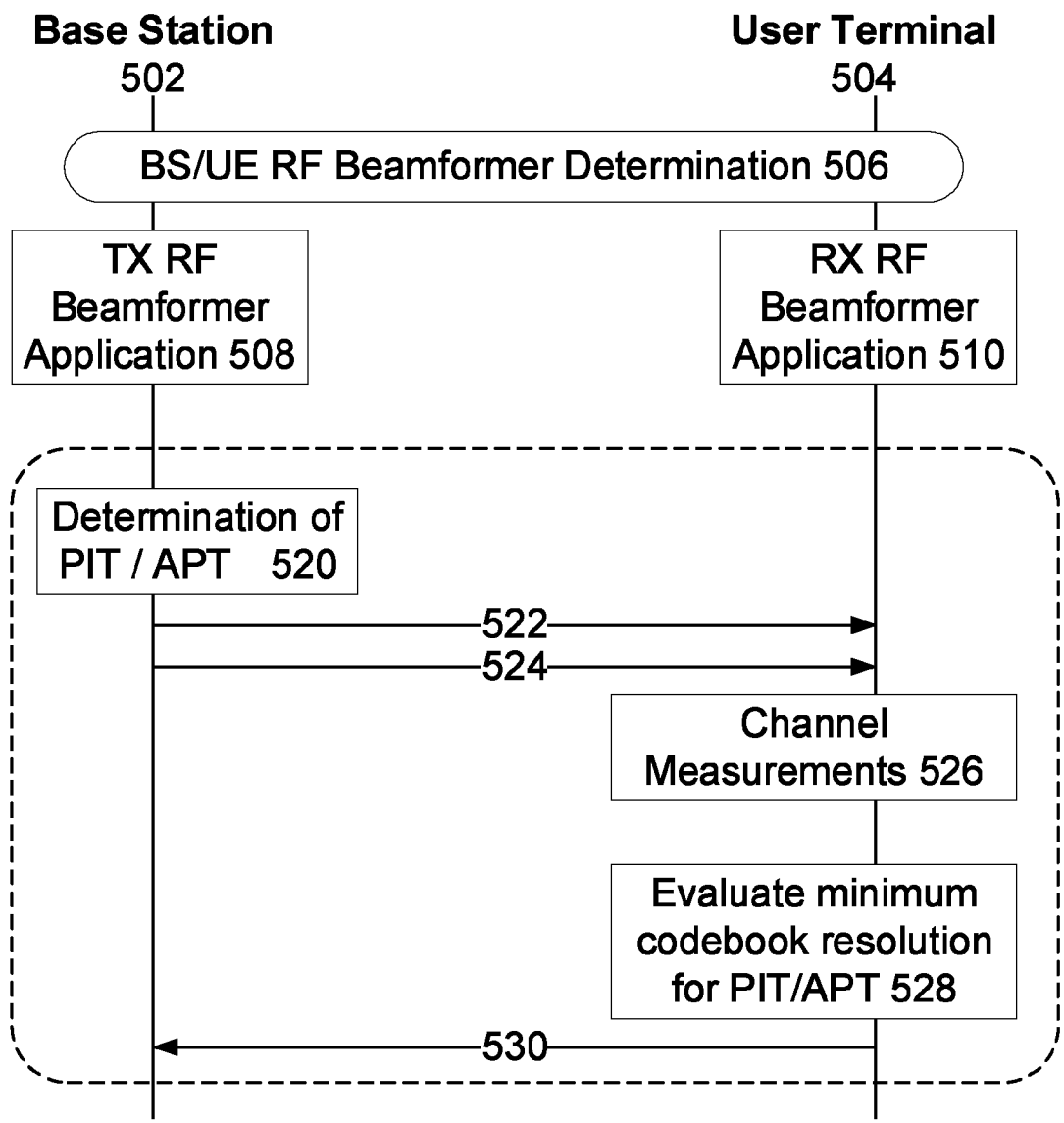
FIG. 5 illustrates a flow diagram of an example system process according to one or more embodiments.

In another embodiment, in the flow diagram of FIG. 5, the base station configures at least one user terminal with an APT, rather than a PIT. The APT may be used by the user terminal to determine the minimum digital precoder codebook resolution that can be used to achieve the configured APT.

Similar to the previous embodiment discussed in relation to FIG. 5, analog beamformers of both base station 502 and user terminal 504 are first determined (506), and applied (508, 510). Then, depending on the application-related performance requirement (e.g. data rate, latency, etc.), the base station may select an APT corresponding to a certain metric of the link quality (520). For instance, the metric may be the channel capacity, the SNR, or the highest modulation and coding scheme (MCS) that can be used to guarantee an error rate higher than certain value (akin to CQI in LTE). After the value of APT is selected, the APT may be transmitted, for example, as configuration information (522), by the base station to at least one of the user terminals in its coverage area based on unicast/multicast/broadcast signaling, depending on whether it is a user-specific configuration or cell-specific configuration.

Downlink reference signals (such as CSI-RS) may be transmitted (524) under the settings of analog beamformers determined earlier so that the user terminal can measure the effective channel $H_{eff}$ (526), which is a $N_r^{RF}$-by-$N_r^{RF}$ channel matrix. Based on the measured channel $H_{eff}$, the user terminal evaluates the minimum digital precoder codebook resolution (528) that allows the resultant performance to reach the configured APT. An example procedure that the user terminal can undertake to determine the minimum codebook resolution is illustrated in the flow diagram of FIG. 7, where a user terminal may determine a codebook resolution index value (e.g., according to Table 1) based on the configured value of APT. In this example, the user terminal may calculate channel capacities under different digital precoder codebook resolution index values i (denoted as $C_{DP,i}$), and determine the value of i which maps to the smallest codebook resolution/size that achieves $C_{DP,i} \geq \text{APT}$.

Thus, determining a minimum digital precoder codebook resolution may include calculating link quality metric values (e.g., channel capacity, SNR or bit error rate) under different digital precoder codebook resolution index values i ($C_{DP,i}$), and determining the value of i which maps to the smallest codebook resolution/size such that $C_{DP,i}$ satisfies the APT as the minimum digital precoder codebook resolution.

Mobility level and battery status may also be taken into account in this example. That is, one or more assistance parameters, such as APT, may be determined based on at least one of network status, such as traffic load, or user terminal status, such as mobility and/or battery status of the user terminal. When the user terminal (such as a mobile phone, tablet, or other mobile device) is either moving too fast or running out of battery, digital precoder feedback can be exempted regardless of the configured APT (for instance, as in Table 1 where codebook resolution index i=0 maps to precoder report bit-width of 0).

Note that for each user terminal, at least one indication of codebook resolution may be reported to the base station by the user terminal (530), which represents at least one radio resource (time/frequency/code) that potentially can be scheduled to the user terminal for subsequent downlink services. That is the at least one indication of codebook resolution may be a suggestion as to which codebook resolution the user terminal has selected to meet above-mentioned criterial. The indication of codebook resolution may preferably be reported to the base station before the next update of codebook resolution.

Figure 6:
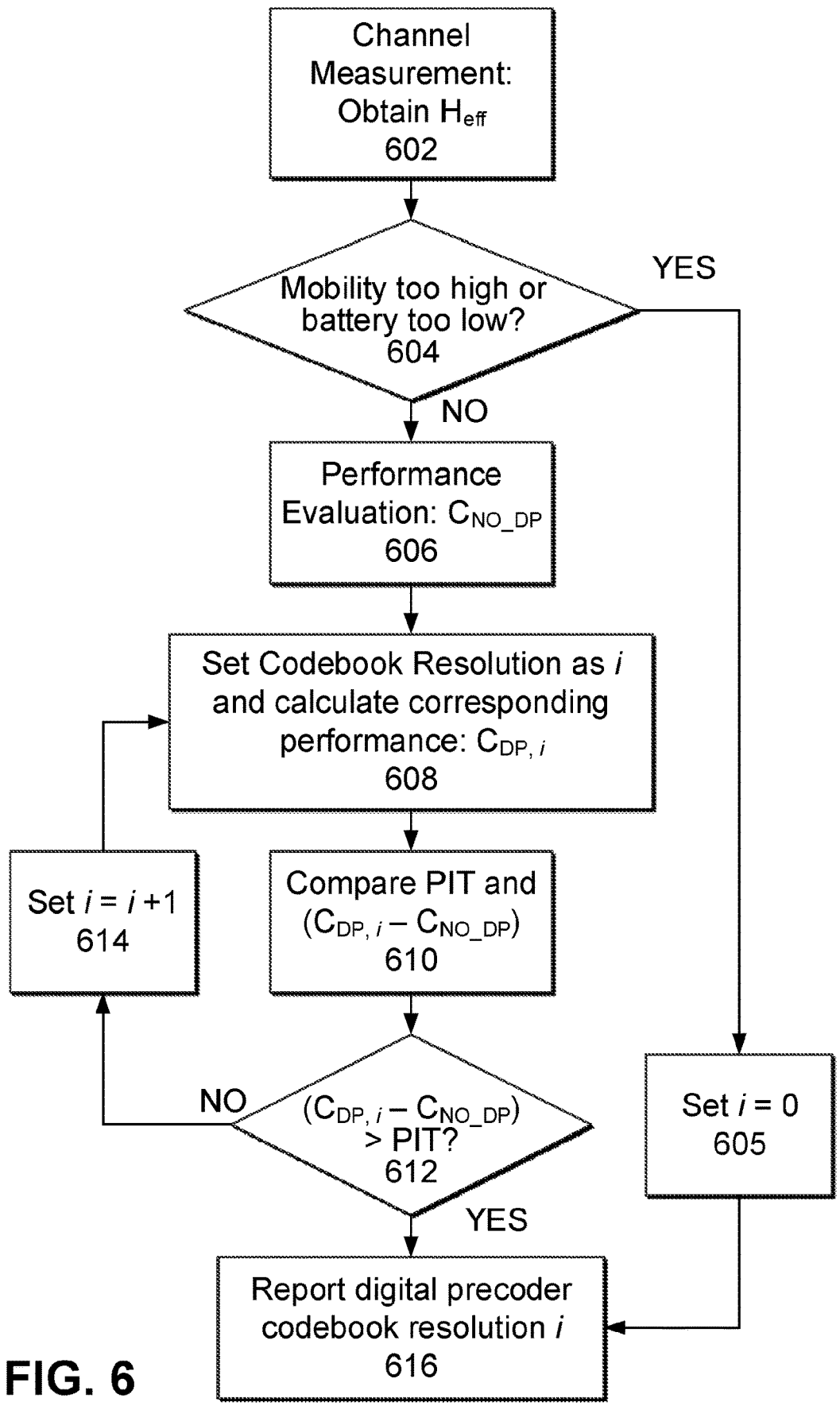
FIG. 6 illustrates a flow diagram of a first example user terminal process of FIG. 5, according to one or more embodiments.
Figure 7:
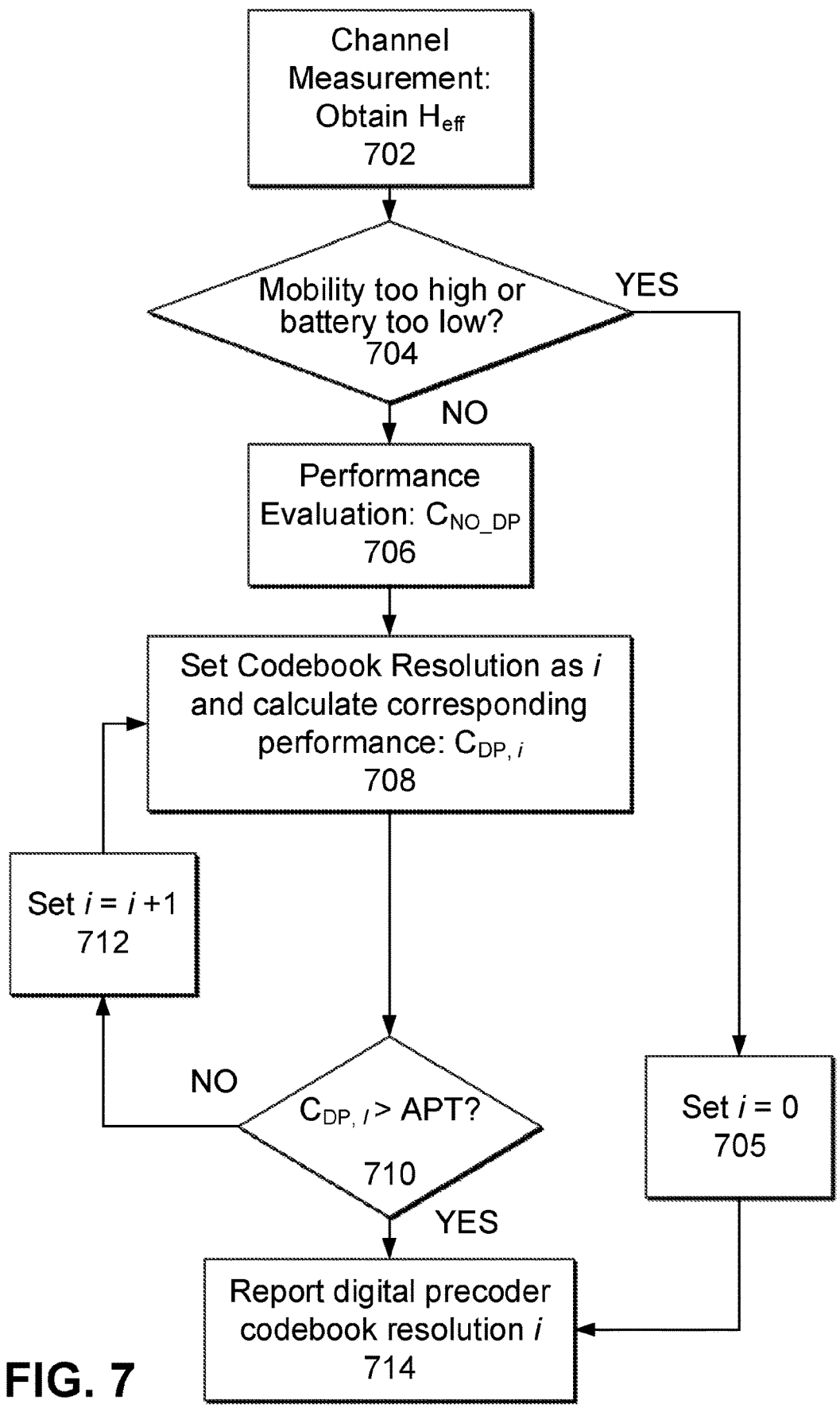
FIG. 7 illustrates a flow diagram of a second example user terminal process of FIG. 5, according to one or more embodiments.

In another example embodiment, the basic procedures are similar to the embodiments discussed in relation to FIGS. 5-7, except that threshold levels (e.g., PIT or APT) are not configured by the network (e.g., by the base station), but determined by the user terminal itself. Therefore, the base station does not share the information of any assistance parameters with the user terminal(s) in this case. More generally, upon the measurement of effective channel, the user terminal may calculate and determine the minimum digital precoder codebook resolution that it suggests using in subsequent downlink service sessions. The suggestion(s) on minimum digital precoder codebook resolution may be reported to the base station.

Note that for each user terminal, at least one indication of codebook resolution may be reported to the base station by the user terminal, which represents at least one radio resource (time/frequency/code) that potentially can be scheduled to the user terminal for subsequent downlink services. That is the at least one indication of codebook resolution may be a suggestion as to which codebook resolution the user terminal has selected to meet above-mentioned criterial. The indication of codebook resolution may preferably be reported to the base station before the next update of codebook resolution.

Figure 8:
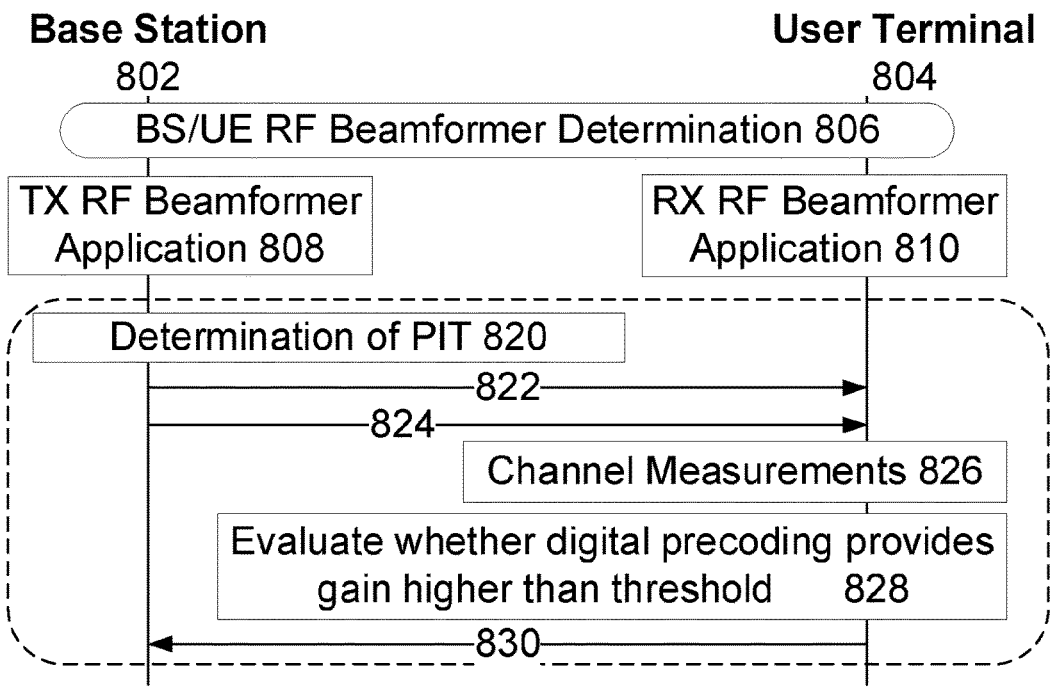
FIG. 8 illustrates a flow diagram of another example system process according to one or more embodiments.

FIG. 8 illustrates a flow diagram for an exemplary procedure according to another embodiment. In the previous exemplary embodiments discussed in relation to FIGS. 5-7, the user terminal determines the resolution of the digital precoder codebook. In the embodiment of the flow diagram of FIG. 8, codebook resolution adaptation includes switching between activation and deactivation of digital precoding (e.g., by activation or deactivation of digital precoder feedback at the user terminal). For example, if digital precoding is deactivated, an identity matrix is always applied in the baseband domain for mapping between data streams and antenna ports (RF chains), which means that the codebook size is one with only a single entry (identity matrix). As such, "deactivation" of digital precoding by the base station is a response to deactivation of digital precoder feedback from a user terminal. Thus, instead of suggesting a suitable codebook resolution, the user terminal may simply transmit one or more binary indications (for multiple radio resources) to the base station to report the necessity (in a YES or NO sense) of digital precoding on top of analog beamforming.

Once the analog beamformers are determined (806) and applied (808, 810), the base station 802 may choose a PIT that will be configured to at least one user terminal 804 (820). Note that a PIT can represent various types of performance metrics. For example, it can be a SNR gain (in dB) or a capacity gain (in bits/sec). The selection of PIT could be determined based on at least one of the following parameters: an availability of uplink resources, a battery status of the user terminal, and/or a mobility level of the user terminal.

For instance, if the uplink resources for CSI reporting is relatively scarce, the base station may tend to set a lower PIT, so the probability that a user terminal finds a low-resolution digital precoding providing performance improvement exceeding PIT is higher, and, hence, results in lower total feedback overhead among all radio resources and all active users. Similarly, a low PIT may be configured if the user has low battery, to reduce the chances that the user terminal may spend more computational power to select a PMI from a higher-resolution (larger) precoder codebook. After the value of PIT is chosen, it should be sent to at least one user terminal based on unicast/multicast/broadcast signaling, depending on whether it is a user-specific configuration or cell-specific configuration.

The downlink reference signals (such as CSI-RS) may be transmitted (824) under the settings of analog beamformers determined earlier so that the user terminal can measure the effective channel $H_{eff}$ (826), which is a $N_r^{RF}$-by-$N_r^{RF}$ channel matrix. Based on the measured effective channel, the user terminal may evaluate performance under hypotheses with and without digital precoding (828). For example, the user terminal may calculate link quality metric values $C_{DP}$ and $C_{NO\_DP}$, which may represent a capacity (or other link quality metric) with and without digital precoding, respectively. Then, the user terminal should compare the difference between these two capacities with the configured PIT value.

If the improvement attributed to digital precoding satisfies the configured PIT (e.g., if the difference is higher than the PIT or lower than the PIT, depending on the link quality metric used), then the user terminal may report a positive indication of applying digital precoding. Otherwise, if the improvement attributed to digital precoding does not satisfy the configured PIT, the user may report a negative indication of applying digital precoding and/or suggest that digital precoding be dispensed, which allows the user terminal to be exempt from overheads such as PMI selection and feedback.

Figure 9:
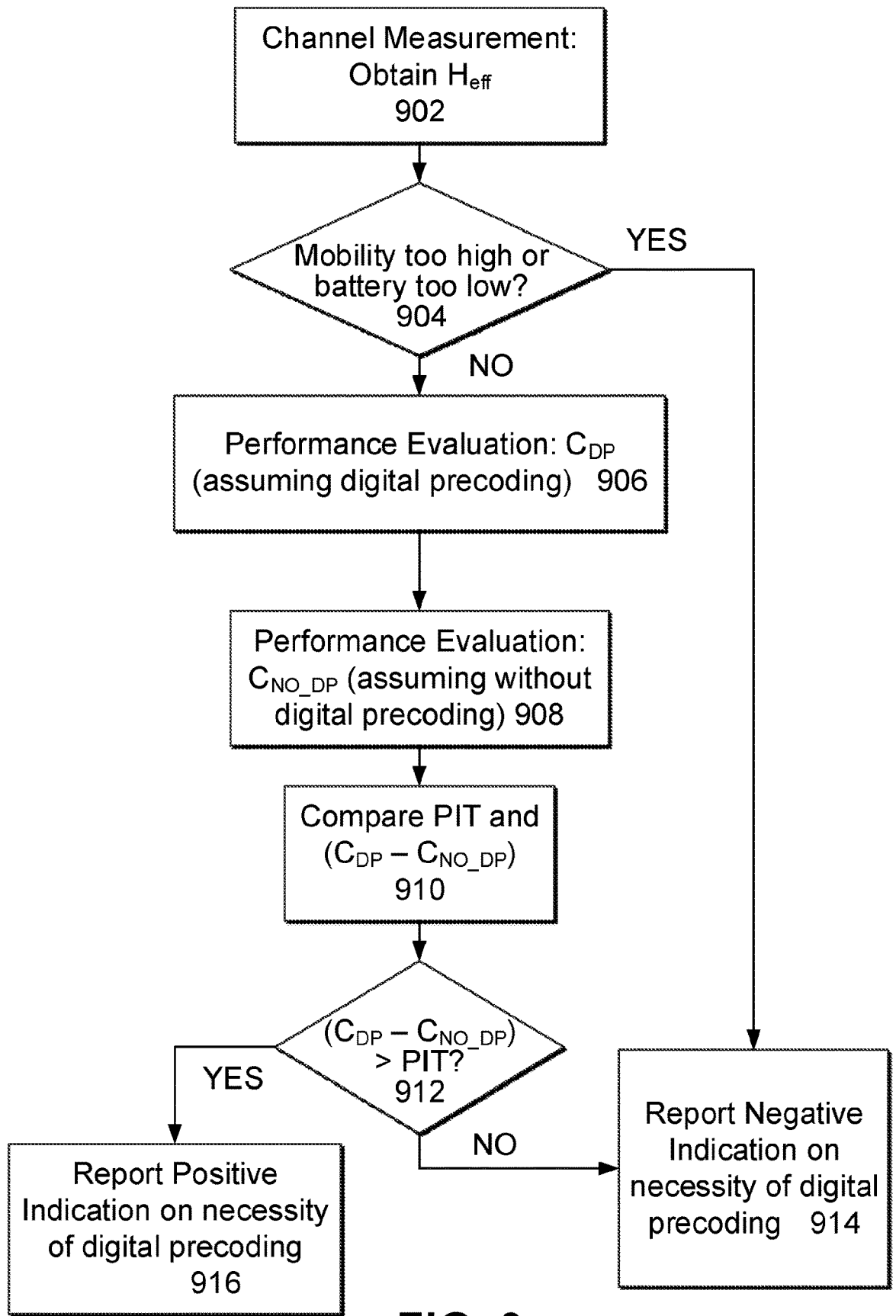
FIG. 9 illustrates a flow diagram of the user terminal process of FIG. 8, according to one or more embodiments.
Figure 11:
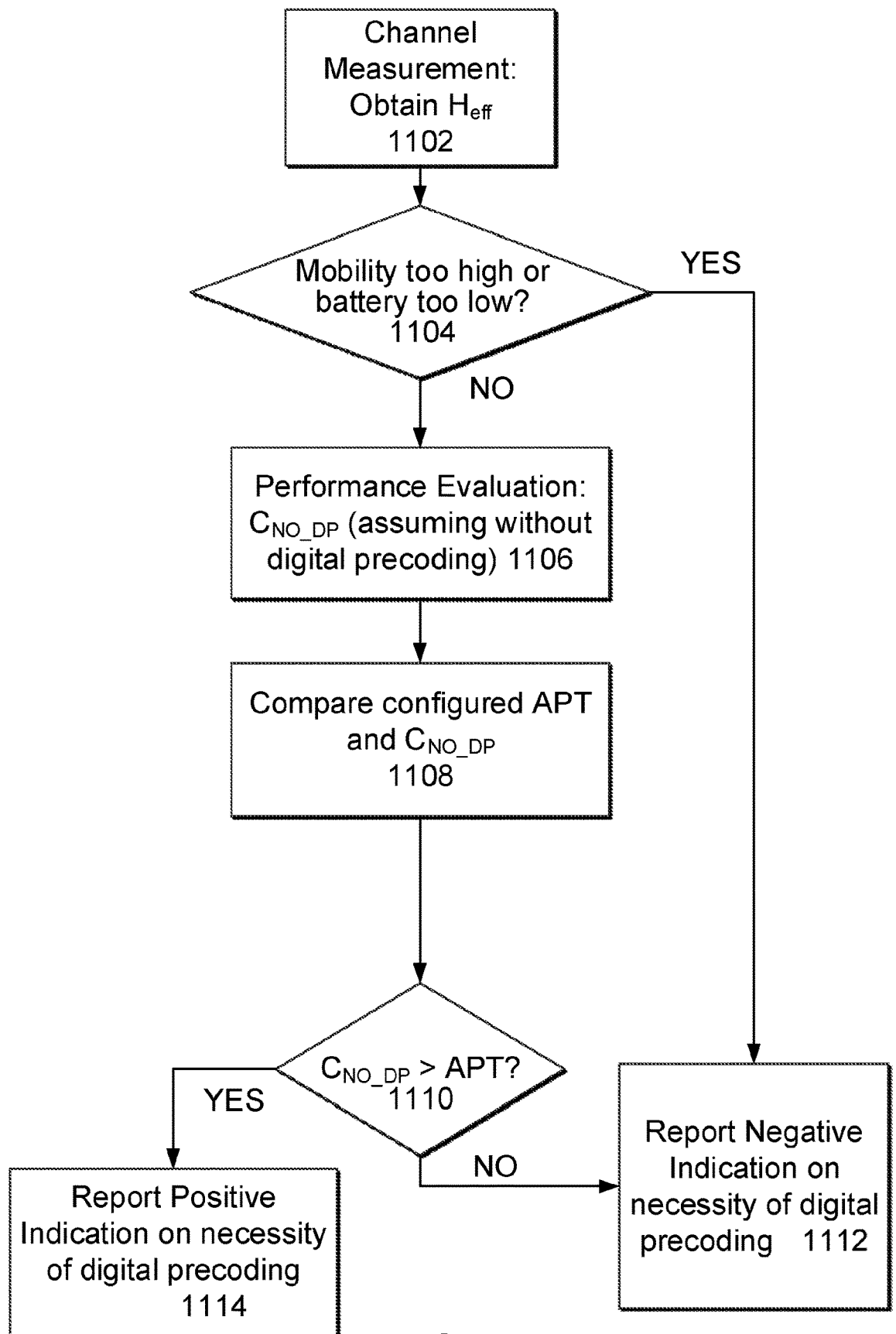
FIG. 11 illustrates a flow diagram of the user terminal process of FIG. 10, according to one or more embodiments.

An example decision logic of the user terminal of FIG. 8 is shown in FIG. 9.

At least one indication should be reported to the base station by the user terminal, which represents at least one radio resource (time/frequency/code) that potentially can be scheduled to the user terminal for subsequent downlink services. For instance, the user terminal may report a bitmap with M≥1 bits to represent necessity of digital precoding in M radio resources (e.g., resource blocks), where 0 and 1 indicate that digital precoding is desired or not respectively, or vice versa.

Figure 10:
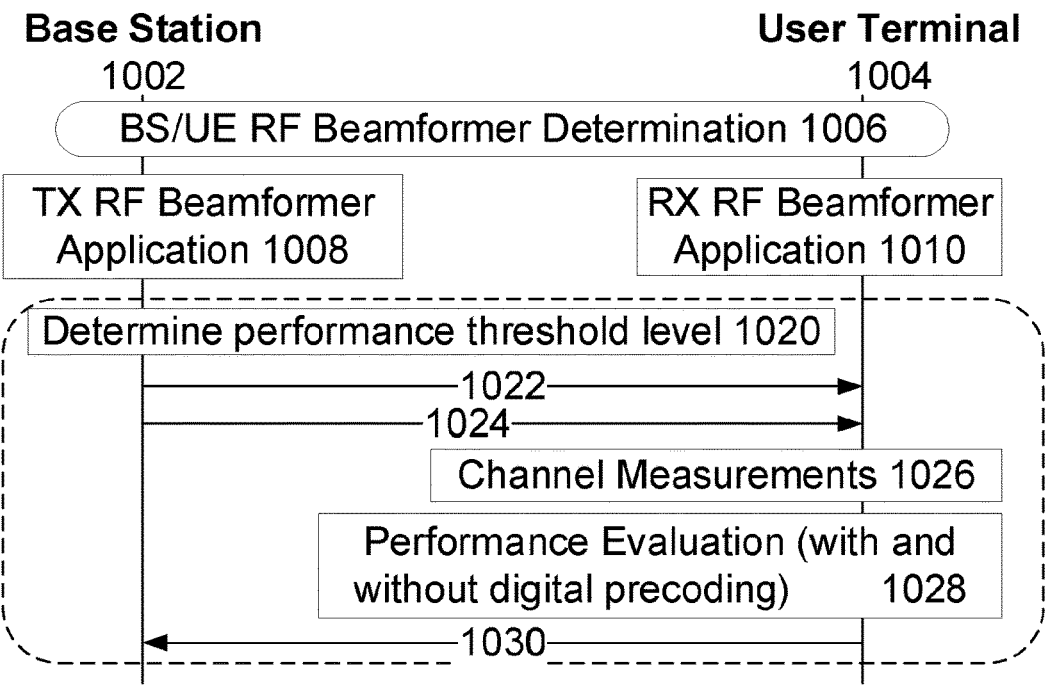
FIG. 10 is a system diagram of an example radio access network and an example core network that may be used within the communications system illustrated in FIG. 1A.

FIG. 10 illustrates a flow diagram of an example procedure according to another example embodiment. In this embodiment, the base station configures at least one user terminal with an APT, which can be used by the user terminal to determine whether digital precoding is desired in addition to analog beamforming.

Similar to the process described in the previous example embodiment, analog beamformers/combiners of both base station and user terminal are first determined. Then, depending on the application-related performance requirement (e.g., data rate, latency), the base station may select an APT corresponding to a certain metric of the link quality. For instance, the metric may include the channel capacity, the SNR, or the highest modulation and coding scheme (MCS) that can be used to guarantee an error rate higher than certain value. After the value of this APT is chosen, it should be sent to at least one user terminal based on unicast/multicast/ broadcast signaling, depending on whether it is a user-specific configuration or cell-specific configuration.

The downlink reference signals (such as CSI-RS) may be transmitted under the settings of analog beamformers determined earlier so that the user terminal can measure the effective channel $H_{\mathit{eff}}$, which is an $N_r^{RF}$-by-$N_r^{RF}$ channel matrix. Based on the measured effective channel, the user terminal should evaluate performance under hypotheses without digital precoding. For example, the user terminal may first evaluate $C_{NO\_DP}$, which may represent a capacity (or other link quality metric) without digital precoding. Then, the user terminal may compare the value of $C_{NO\_DP}$ with the configured APT.

If the value of $C_{NO\_DP}$ satisfies the configured APT (e.g., greater than or equal to the APT or lower than the APT, depending on the link quality metric used), then the user terminal may report a negative indication of applying digital precoding and may suggest that digital precoding can be dispensed, which may allow the user terminal to be exempt from overheads such as PMI selection and feedback. Otherwise, if the configured APT is not satisfied, the user terminal may report a positive indication of applying digital precoding, such that digital precoding may be applied to reach the performance threshold (or at least improve performance over non-application of the digital precoding).

At least one indication should be reported by the user terminal, which represents at least one radio resource (time/frequency/code) that potentially can be scheduled to the user terminal for subsequent downlink services. For instance, the user terminal may report a bitmap with M≥1 bits to represent necessity of digital precoding in M radio resources (e.g., resource blocks), where 0 and 1 indicate that digital precoding is desired or not respectively, or vice versa.

In another example embodiment, the basic procedures are similar to the two previous example embodiments, except that threshold levels (either PIT or APT) are not configured by the network (e.g., the base station), but instead determined by the user terminal itself. Therefore, the base station does not share the information of any assistance parameters with the user terminal in this case. More generally, upon the measurement of effective channel, the user terminal may calculate and determine whether or not digital precoding should be used in at least one radio resource in subsequent downlink service sessions. The indications and/or suggestions on necessity of digital precoding may be reported to the base station by the user terminal. At least one indication should be reported by the user terminal, which represents at least one radio resource (time/frequency/code) that potentially can be scheduled to the user terminal for subsequent downlink services.

In one exemplary embodiment, there may be a multi-resolution precoder codebook based on LTE-A. In 3GPP LTE-A, a dual-codebook structure has been adopted for cases with eight antenna ports. In this framework, the precoder W is obtained as a product of a long-term precoder $W_1$ and a short-term precoder $W_2$:

$$W = W_1 W_2 \qquad \text{Eq. 4}$$

In this embodiment, multiple versions of such dual-codebook are specified, and each of the multiple versions is associated to a codebook resolution i. Using the systems and methods set forth herein, the resolution of the codebook may be adjusted in either or both of the long-term ($W_1$) and short term ($W_2$) components, as described below.

With regard to a long-term codebook $W_1$, the structure of the long-term precoder $W_1$ is a block-diagonal matrix that can be written as:

$$W_1 = \begin{bmatrix} X_1 & 0 \\ 0 & X_2 \end{bmatrix} \qquad \text{Eq. 5}$$

where sub-matrices $X_1$ and $X_2$, dedicated to two different antenna polarizations, are a set of DFT column vectors (e.g., beam group). In the specifications of 3GPP LTE-A, only the case of $X_1 = X_2$ is present, so in that case the same beam group may be used by both of the antenna polarizations.

To increase the codebook resolution according to the present disclosure, the number of $W_1$ codebook entries may be increased by adding the cases where $X_1 \neq X_2$. Thus, the codebook can also cover the cases where different beam groups are used by the two different antenna polarizations. In such cases, the content possibility of $W_1$ may become more diverse, and more feedback bits may be needed to capture this higher resolution codebook.

For instance, there are 16 possible entries of $X_P$(P=1,2), two exemplary codebook resolutions of $W_1$ are tabulated below in Table 2:

TABLE 2

Example Multi-Resolution Codebook for $W_1$

| $W_1$ Codebook Resolution index, i | $W_1$ Codebook Size | $W_1$ Bit-width (bits) |
|---|---|---|
| 0 ($X_1 = X_2$) | 16 | 4 |
| 1 ($X_1 \neq X_2$) | 256 | 8 |

In addition, the $W_1$ codebook resolution can also be changed by adjusting the oversampling factor of the DFT vectors in the beam group $X_P$.

With regard to a short-term codebook $W_2$, the structure of the short-term precoder $W_2$ can be deemed as a stack of two selection vectors (for the two antenna polarizations respectively), that is written as:

$$W_2 = \frac{1}{\sqrt{2}} \begin{bmatrix} Y_1 \\ Y_2 \end{bmatrix} \qquad \text{Eq. 6}$$

where $Y_P$ (P=1,2) has only one non-zero entry that chooses a column vector out of $X_P$ in the reported $W_1$. Given that each of the beam group $X_P$ has four column vectors, the possibility of $Y_P$ are:

$$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

This leads to a codebook size of 16 for $W_2$. To increase the resolution of $W_2$ codebook, the cases of equal-gain linear combinations of a pair of beams within a beam group $X_P$ may be considered. Therefore, the possibility of $Y_P$ becomes:

$$\left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}, \begin{bmatrix} 0.5 \\ 0.5 \\ 0 \\ 0 \end{bmatrix}, \begin{bmatrix} 0.5 \\ 0 \\ 0.5 \\ 0 \end{bmatrix}, \begin{bmatrix} 0.5 \\ 0 \\ 0 \\ 05 \end{bmatrix}, \begin{bmatrix} 0 \\ 0.5 \\ 0.5 \\ 0 \end{bmatrix}, \begin{bmatrix} 0 \\ 0.5 \\ 0 \\ 05 \end{bmatrix}, \begin{bmatrix} 0 \\ 0 \\ 0.5 \\ 0.5 \end{bmatrix} \right\}$$

The size of $W_2$ codebook is now 100. Thus, two exemplary codebook resolutions of $W_2$ may exist, as tabulated below in Table 3:

TABLE 3

Example Multi-Resolution Codebook for $W_2$

| $W_2$ Codebook Resolution index, i | $W_2$ Codebook Size | $W_2$ Bit-width (bits) |
|---|---|---|
| 0 | 16 | 4 |
| 1 | 100 | 7 |

Accordingly, in one or more embodiments as set forth herein, any multi-resolution codebook can be applied to $W_1$ only, to $W_2$ only, or to both $W_1$ and $W_2$. Furthermore, apart from the examples given above, the discussed systems and methods are applicable to any precoder codebook framework.

In one embodiment, there is a method for wireless communications, comprising: transmitting a signal using hybrid beamforming including adaptively applying digital beamforming and analog beamforming, the digital beamforming comprising: adaptively configuring a digital precoder codebook resolution. The method may further comprise: determining at least one analog beamformer and combiner; determining a lowest codebook resolution of digital precoding that is required to achieve at least one performance parameter; and transmitting the determined lowest codebook resolution of digital precoding to a network. The may also further comprise: receiving downlink reference signals that indicate an analog beamforming configuration based on the determined analog beamformer and combiner; measuring an effective channel based on the indicated analog beamforming configuration; and determining a lowest codebook resolution of digital precoding that is required to achieve at least one performance parameter and the measured effective channel. The method may also further comprise: determining at least one assistance parameter as the at least one performance parameter; and transmitting the at least one assistance parameter to a wireless transmit receive unit (WTRU). The method may include wherein the at least one assistance parameter is a performance improvement threshold (PIT) or an absolute performance threshold (APT). The method may include wherein the at least one assistance parameter is determined based on at least one of network status, such as traffic load, or WTRU status, such as mobility and/or battery status. The method may further comprise: calculating, based on at least one of a measured effective channel or an assistance parameter, at least one digital precoding codebook resolution that maintains a radio link to a base station with a sufficiently high quality to support a desired performance; and transmitting the at least one calculated digital precoding codebook resolution to the base station. The method may further comprise: configuring a baseband module for downlink data transmission in radio resources scheduled for the WTRU according to a digital precoding codebook resolution received from the WTRU; and transmitting, by the configured baseband module, the downlink data transmission. The method may include wherein determining a minimum digital precoder codebook resolution comprises: calculating a channel capacity without digital precoding ($C_{NO\_DP}$) and channel capacities under different digital precoder codebook resolution index values i ($C_{DP,i}$); and determining the value of i which maps to the smallest codebook resolution/size that achieves $C_{DP,i}$-$C_{NO\_DP}$>PIT as the minimum digital precoder codebook resolution. The method may include wherein determining a minimum digital precoder codebook resolution comprises: calculating a link quality metric value without digital precoding ($C_{NO\_DP}$) and link quality metric values under different digital precoder codebook resolution index values i ($C_{DP,i}$); and determining the value of i which maps to the smallest codebook resolution/size such that a performance difference between $C_{DP,i}$ and $C_{NO\_DP}$ satisfies a PIT, as the minimum digital precoder codebook resolution. The method may include wherein determining a minimum digital precoder codebook resolution comprises: calculating channel capacities under different digital precoder codebook resolution index values i ($C_{DP,i}$); and determining the value of i which maps to the smallest codebook resolution that achieves $C_{DP,i}$>APT as the minimum digital precoder codebook resolution. The method may include wherein determining a minimum digital precoder codebook resolution comprises: calculating link quality metric values under different digital precoder codebook resolution index values i ($C_{DP,i}$); and determining the value of i which maps to the smallest codebook resolution/size such that $C_{DP,i}$ satisfies an APT as the minimum digital precoder codebook resolution. The method may further comprise: determining, by a WTRU, at least one assistance parameter; determining at least one minimum digital precoder codebook resolution based on the determined at least one assistance parameter; and transmitting the at least one minimum digital precoder codebook resolution to the base station. The method may further comprise: determining whether to activate or deactivate digital precoding; switching between activation and deactivation of digital precoder feedback based on the determination whether to activate or deactivate the digital precoding; and transmitting a report whether digital precoding is active. The method may further comprise: determining whether to activate or deactivate digital precoding; transmitting a report whether digital precoding is active; and switching between activation and deactivation of digital precoder feedback based on the report. The method may include wherein determining whether to activate or deactivate digital precoding is based on a threshold test using, wherein the threshold is a PIT or an APT. The method may further comprise: adjusting a digital precoder codebook resolution, including adjusting at least one of a short-term codebook resolution component or a long-term codebook resolution component of the digital precoder codebook resolution.

In one embodiment, there may be a wireless transmit/receive unit (WTRU) configured to perform at least part of any combination of the method as set forth above. In one embodiment, there may be a server configured to perform at least part of any combination of the method as set forth above. In one embodiment, there is a system, comprising a transmitter and a receiver, configured to perform at least part of any combination of the method as set forth above. In one embodiment, there is at least one processor configured to perform at least part of any combination of the method as set forth above. In one embodiment, there is a network element configured to perform at least part of any combination of the method as set forth above. In one embodiment, there is a base station configured to perform at least part of any combination of the method as set forth above. In one embodiment, there is an access point (AP) configured to perform at least part of any combination of the method as set forth above. In one embodiment, there is a station (STA) configured to perform at least part of any combination of the method as set forth above. In one embodiment, there is an integrated circuit configured to perform at least part of any combination of the method as set forth above. In one embodiment, there is a computing device configured to perform at least part of any combination of the method as set forth above. In one embodiment, there are instructions stored on a non-transitory computer readable storage medium which when executed by a processing device cause the processing device to perform at least part of any combination of the method as set forth above.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for a mmWave user terminal capable of analog beamforming and digital beamforming, the method comprising:
   receiving, from an access node, a downlink reference signal using an analog beamforming setting;
   measuring, using the received downlink reference signal, an effective channel based on the analog beamforming setting;
   receiving, from the access node, an assistance parameter indicating a target performance threshold;
   determining, based on the measured effective channel, a minimum digital precoder codebook resolution capable of achieving the performance threshold; and
   sending the determined minimum digital precoder codebook resolution to the access node.

2. The method of claim 1, wherein the assistance parameter comprises a performance improvement threshold (PIT).

3. The method of claim 2, wherein determining the minimum digital precoder codebook resolution comprises:
   calculating a channel capacity without digital precoding ($C_{NO\_DP}$) and channel capacities under different digital precoder codebook resolution index values i ($C_{DP, i}$); and
   determining a smallest codebook resolution that achieves $C_{DP, i} - C_{NO\_DP} >$ PIT as the minimum digital precoder codebook resolution.

4. The method of claim 3, wherein each digital precoder codebook resolution index value i is mapped to a single available digital precoder codebook resolution.

5. The method of claim 2, wherein determining the minimum digital precoder codebook resolution comprises:
   calculating a link quality metric value without digital precoding ($C_{NO\_DP}$) and link quality metric values under different digital precoder codebook resolution index values i ($C_{DP, i}$); and
   determining a smallest codebook resolution such that a performance difference between $C_{DP, i}$ and $C_{NO\_DP}$ satisfies a PIT, as the minimum digital precoder codebook resolution.

6. The method of claim 1, wherein the assistance parameter comprises an absolute performance threshold (APT).

7. The method of claim 6, wherein determining the minimum digital precoder codebook resolution comprises:
   calculating channel capacities under different digital precoder codebook resolution index values i ($C_{DP, i}$); and
   determining a smallest codebook resolution that achieves $C_{DP, i} >$ APT as the minimum digital precoder codebook resolution.

8. The method of claim 7, wherein each digital precoder codebook resolution index value i is mapped to a single available digital precoder codebook resolution.

9. The method of claim 6, wherein determining the minimum digital precoder codebook resolution comprises:
   calculating link quality metric values under different digital precoder codebook resolution index values i ($C_{DP, i}$); and
   determining a smallest codebook resolution such that $C_{DP,i}$ satisfies the APT as the minimum digital precoder codebook resolution.

10. The method of claim 1, wherein the assistance parameter is received in a radio resource control reconfiguration message from the access node.

11. The method of claim 1, wherein the determined minimum digital precoder codebook resolution indicates that digital precoder feedback is deactivated by the user terminal.

12. The method of claim 1, further comprising receiving at the user terminal from the access node a subsequent downlink data transmission using the determined minimum digital precoder codebook resolution sent to the access node.

13. The method of claim 1, wherein determining the minimum digital precoder codebook resolution comprises:
   determining, based on the measured effective channel, the received assistance parameter, and at least one of a mobility level of the user terminal and a battery status of the user terminal, that digital precoder feedback of the user terminal should be deactivated; and
   determining the minimum digital precoder codebook resolution as 0.

14. The method of claim 1, further comprising:
   communicating to the access node at least one of i) an availability of uplink resources, ii) a battery status of the user terminal, and iii) a mobility level of the user terminal; and
   wherein the received assistance parameter is based at least in part on the communicated at least one of i) the availability of uplink resources, ii) the battery status of the user terminal, and iii) the mobility level of the user terminal.

15. The method of claim 1, wherein the determined minimum digital precoder codebook resolution is a codebook resolution of one of (i) a short-term precoder component and (ii) a long-term precoder component.

16. A user terminal comprising a processor and a non-transitory computer-readable storage medium storing instructions operative, when executed on the processor, to perform functions including:
- receiving, from an access node, a downlink reference signal using an analog beamforming setting;
- measuring, using the received downlink reference signal, an effective channel based on the analog beamforming setting;
- receiving, from the access node, an assistance parameter indicating a target performance threshold;
- determining, based on the measured effective channel, a minimum digital precoder codebook resolution capable of achieving the performance threshold; and
- sending the determined minimum digital precoder codebook resolution to the access node.

17. The user terminal of claim 16, wherein the assistance parameter comprises a performance improvement threshold (PIT), and wherein determining the minimum digital precoder codebook resolution comprises:
- calculating a channel capacity without digital precoding ($C_{NO\_DP}$) and channel capacities under different digital precoder codebook resolution index values i ($C_{DP,\ i}$); and
- determining a smallest codebook resolution that achieves $C_{DP,\ i} - C_{NO\_DP} >$ PIT as the minimum digital precoder codebook resolution.

18. The user terminal of claim 16, wherein the assistance parameter comprises a performance improvement threshold (PIT), and wherein determining the minimum digital precoder codebook resolution comprises:
- calculating a link quality metric value without digital precoding ($C_{NO\_DP}$) and link quality metric values under different digital precoder codebook resolution index values i ($C_{DP,\ i}$); and
- determining a smallest codebook resolution such that a performance difference between $C_{DP,\ i}$ and $C_{NO\_DP}$ satisfies a PIT, as the minimum digital precoder codebook resolution.

19. The user terminal of claim 16, wherein the assistance parameter comprises an absolute performance threshold (APT), and wherein determining the minimum digital precoder codebook resolution comprises:
- calculating channel capacities under different digital precoder codebook resolution index values i ($C_{DP,\ i}$); and
- determining a smallest codebook resolution that achieves $C_{DP,\ i}1 >$ APT as the minimum digital precoder codebook resolution.

20. The user terminal of claim 16, wherein the assistance parameter comprises an absolute performance threshold (APT), and wherein determining the minimum digital precoder codebook resolution comprises:
- calculating link quality metric values under different digital precoder codebook resolution index values i ($C_{DP,\ i}$); and
- determining a smallest codebook resolution such that $C_{DP,i}$ satisfies the APT as the minimum digital precoder codebook resolution.

* * * * *

UNITED STATES PATENT AND TRADEMARK OFFICE
CERTIFICATE OF CORRECTION

PATENT NO. : 11,152,980 B2  
APPLICATION NO. : 16/493698  
DATED : October 19, 2021  
INVENTOR(S) : Ping-Heng Kuo et al.

Page 1 of 1

It is certified that error appears in the above-identified patent and that said Letters Patent is hereby corrected as shown below:

In the Claims

At Column 24 Line 20, Claim 19, replace "$C_{DP,i}1>APT$" with --$C_{DP,i}>APT$--

Signed and Sealed this  
Nineteenth Day of November, 2024

Katherine Kelly Vidal  
*Director of the United States Patent and Trademark Office*